Sept. 8, 1936.  R. D. EVANS  2,053,427
EXCITATION CONTROL APPARATUS
Filed July 16, 1935  2 Sheets-Sheet 1
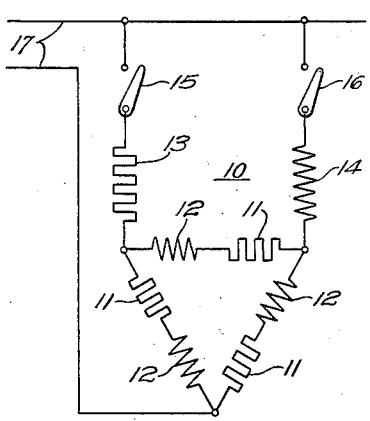
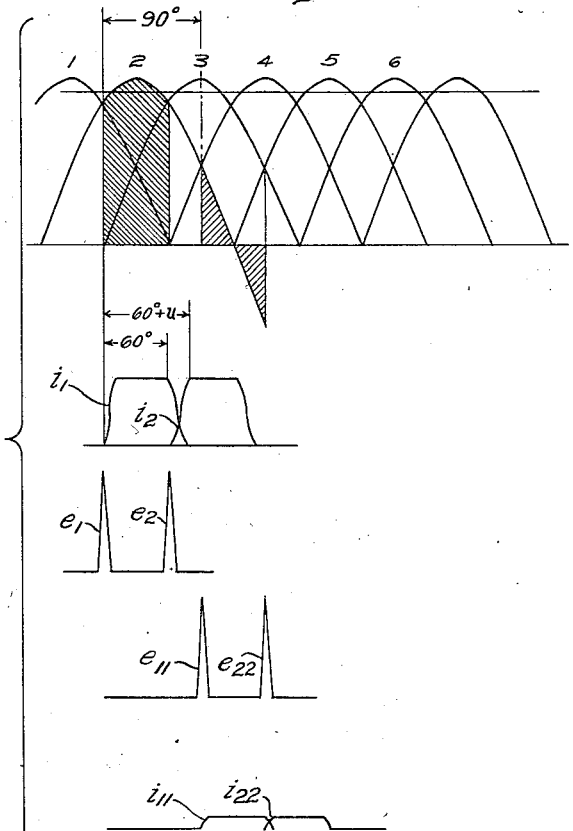
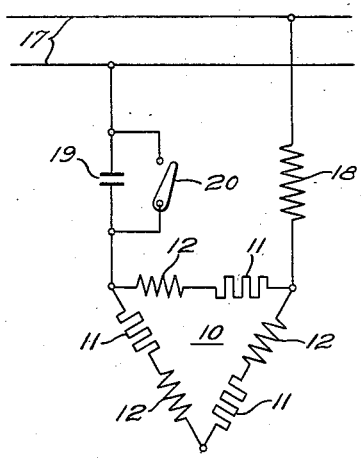
WITNESSES:
C. J. Weller.
Geo. O. Harrison.
INVENTOR
Robert D. Evans.
BY
ATTORNEY Sept. 8, 1936.  R. D. EVANS  2,053,427

EXCITATION CONTROL APPARATUS

Filed July 16, 1935  2 Sheets-Sheet 2

INVENTOR
Robert D. Evans.

Patented Sept. 8, 1936

2,053,427

UNITED STATES PATENT OFFICE 2,053,427

EXCITATION CONTROL APPARATUS

Robert D. Evans, Swissvale, Pa., assignor to Westinghouse Electric & Manufacturing Company, East Pittsburgh, Pa., a corporation of Pennsylvania Application July 16, 1935, Serial No. 31,619

5 Claims. (Cl. 175—363)

My invention relates to static impedance networks for controlling the excitation of polyphase converting apparatus of the space-discharge type, and particularly to such converting apparatus as applied for rectifying, derectifying or otherwise modifying power currents. As examples of the classes of apparatus to which the invention is particularly applicable may be mentioned mercury-arc rectifiers and inverters as used to connect alternating-current and direct-current power circuits.

In my copending application, Serial No. 697,675 filed November 11, 1933, and assigned to the Westinghouse Electric & Manufacturing Company, I have disclosed a symmetrical static impedance mesh which operates to transform single-phase alternating current energy to balanced polyphase energy for the excitation of the grids of an inverter or other polyphase space discharge device. Although the impedance network disclosed in the above-entitled application is satisfactory for the purposes contemplated, it does not provide for shifting the phase of excitation voltages through angles other than 60° or its multiples. In some application of polyphase discharge apparatus, it is desirable to produce phase angle shifts of other magnitudes, such as 90°, for example.

It is an object of my invention to provide an impedance arrangement similar to that disclosed in my above-mentioned application, but which will provide means for effecting a shift of the polyphase excitation voltages through any desired phase angle, without change of the symmetry or magnitude of the component voltages of the polyphase system.

Other objects of my invention will become evident from the following detailed description taken in conjunction with the accompanying drawings, in which:

Figure 1 is a diagrammatic view of an improved static impedance network embodying my invention.

Fig. 2 is a diagrammatic view of a modification of the impedance network shown in Fig. 1.

Fig. 4 is a diagrammatic view illustrating the relationship of variables in the control system of Fig. 3.

Figure 3:
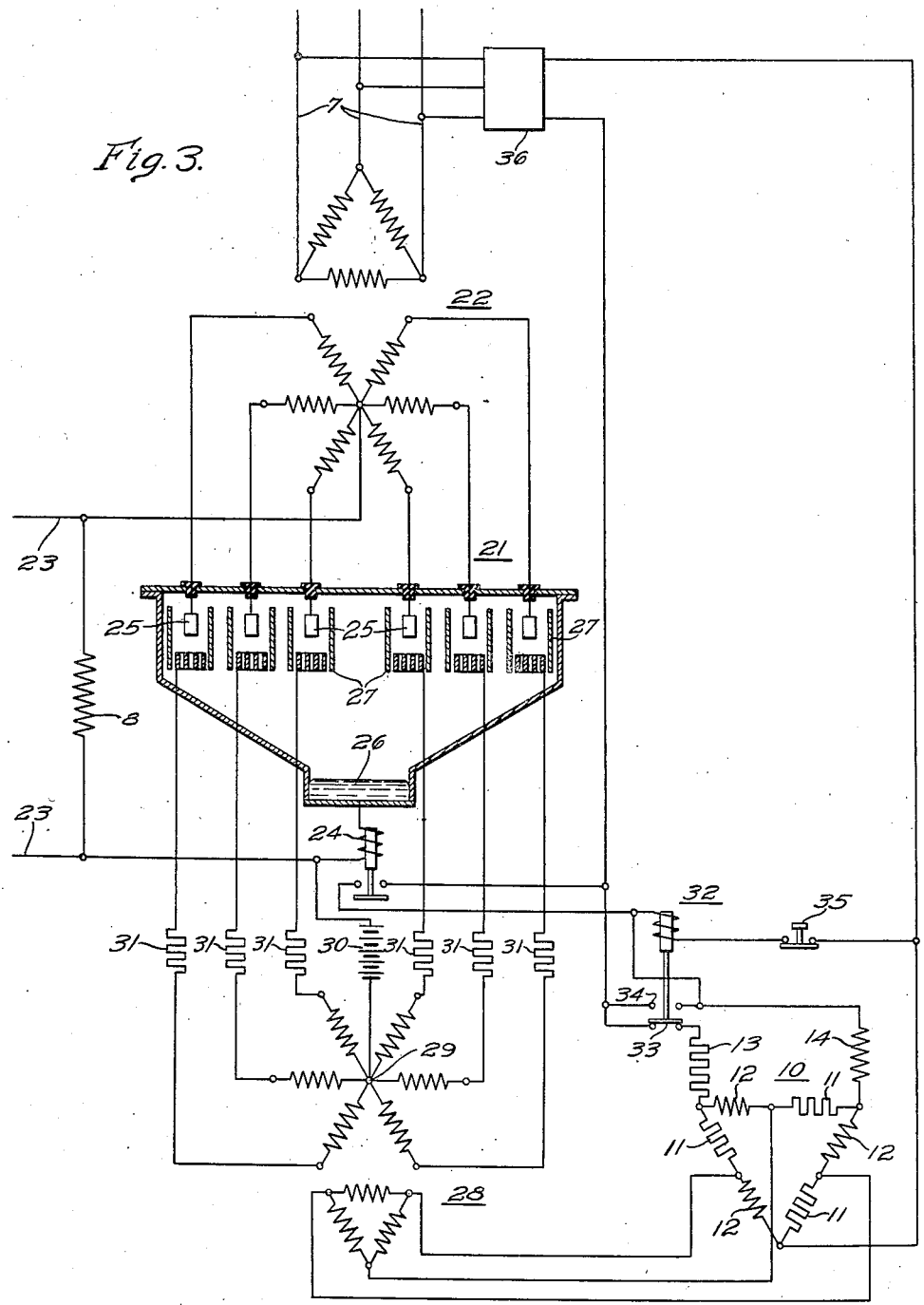
Fig. 3 is a diagrammatic view of a control system for a mercury arc rectifier, utilizing the static impedance network of Fig. 1.

Referring to Fig. 1 in detail, a delta mesh 10, consisting of three equal resistors 11 and three equal impedances 12, is arranged to be supplied from a single phase alternating current source 17, in series with an external resistor 13 or an external impedance 14. A pair of switches 15 and 16 is provided for connecting the mesh 10 in series with one or the other of the external impedances 13 or 14, respectively.

The impedances 12 have the same absolute impedance values as the resistors 11, but have a lagging power factor angle of 60°, as described in my copending application mentioned above. The resistor 13 and impedance 14 are original with the present application, and are so designed, with reference to the mesh 10, as to produce a shift in phase position of the symmetrical system of voltages derived from the mesh 10 without change of symmetry or magnitude of the component voltages of the system. It should be noted, in this connection, that in the absence of special impedance relationships, the effect of introducing impedance in series with the mesh 10, will be to change both the magnitudes and phase angle of the polyphase voltage derived from the mesh. In order to avoid the undesirable effect of a change of the magnitude of the polyphase voltage, I preferably relate the constants of the external impedances 13 and 14 in such manner that the following relationship holds:

$$Z+Z_m = (Z+Z_n)e^{j\frac{360}{n}-\theta} \quad \text{(1)}$$

where $Z$ = equivalent impedance of the mesh 10 between any two delta terminals.
$Z_m$ = impedance of series element 14
$Z_n$ = impedance of series element 13
$e$ = the base of natural logarithms
$j$ = the imaginary $\sqrt{-1}$
$\frac{360}{n}$ = phase rotation, if any, effected by transposing the supply terminals of the mesh 10.
$\theta$ = the angular displacement of excitation voltage desired, usually 90°

Let $r$ = resistance of the resistors 11
then $re^{j60}$ = impedance of the impedance 12

For the values of $r$ and $re^{j60}$ of elements 11 and 12, it may readily be shown that the impedance of the mesh 10 is $$Z = \frac{2}{3}r(1+e^{j60}) \quad \text{---------------(2)}$$

By substituting $$\sqrt{3}\, e^{j30}$$

for the identical constant $1-e^{j60}$, expression (2) becomes $$Z = \frac{2}{\sqrt{3}} re^{j30} \quad \text{---------------(3)}$$

When the connection is changed from switch 15 to switch 16, an equivalent rotation of 120° is effected in the energization voltage of the mesh 10. The quantity $$\frac{360}{n}$$

accordingly is 120°. Assuming that it is desired to rotate the excitation voltages 90°, the value of $\theta$ is 90°. With these values of $$\frac{360}{n} \text{ and } \theta,$$

a value of $Z_m$ may be obtained by arbitrarily assuming a value of $Z_n$.

Assuming $Z_n$ as a pure resistance of magnitude equal in absolute magnitude to the impedance of the mesh 10, $$Z_n = \frac{2}{\sqrt{3}}r \quad \text{---------------(4)}$$

expression (4) may be substituted in (1), giving with the stated values of $$\frac{360}{n} \text{ and } \theta,$$

$$Z_m = \frac{2}{\sqrt{3}}re^{j60} \quad \text{---------------(5)}$$

That is, if $Z_n$ is a pure resistance of magnitude $$\frac{2}{\sqrt{3}}r,$$

then $Z_m$ must be a 60° lagging impedance of the same absolute magnitude in order to produce a phase shift of 90° without change of voltage magnitude.

Fig. 2 shows a modified network in which the mesh 10 is supplied in series with a lagging impedance 18, or in series with both the impedance 18 and a capacitor 19. In this case only one switch 20 is required. It may be shown that this arrangement produces a 90° shift with impedance values calculated in the manner indicated above. In this modification, one pair of satisfactory impedance values is $$\left. \begin{array}{l} Z_{18} = (1.5-j.866)re^{j90} \\ Z_{19} = (1.5-j.866)re^{-j90} \end{array} \right\} \text{---------(6)}$$

where $Z_{18}$ and $Z_{19}$ are the vector impedance values of the external impedances 18 and 19 respectively.

Fig. 3 shows, by way of example, an application of my impedance excitation arrangement to the control of polyphase space-discharge apparatus. In this figure the polyphase space discharge apparatus is shown as a six-phase grid-controlled rectifier 21, connected to polyphase alternating-current feeder 7 by means of a rectifier transformer 22, and to a direct-current load circuit 23, in the usual manner. The impedance of the load circuit 23 is indicated diagrammatically at 8.

The rectifier transformer 22 may be of any suitable type known in the art, and for simplicity is shown as comprising three-phase delta-connected primary windings and six-phase star-connected windings without interphase windings or impedances.

The rectifier 21 comprises an evacuated vessel containing suitable anodes 25 in spaced relationship to a mercury or cadmium pool cathode 26, and having static control grids 27 surrounding the anodes 25. As the construction of such devices is well known in the art, a detailed description is considered unnecessary. It will be understood that, in operation, the evacuated vessel is filled with vapor at low pressure from the cathode 26. An arc discharge takes place continuously from the cathode 26 to the anodes 25 in succession, depending upon the order in which the electrostatic fields produced by each anode 25 and its associated grid 27 becomes more positive than the field produced by the anode carrying the current.

An excitation transformer 28 is provided for exciting the grids 27 of the rectifier 21 in a six-phase sequence corresponding to the sequence of energization of the corresponding anodes 25. The excitation transformer 28 is preferably provided with a saturable core, of known design, for producing secondary voltages of peaked wave form. As shown, the excitation transformer 28 is connected delta-star with a neutral point 29. The neutral point 29 of the secondary windings of the excitation transformer 28 is connected to the anode terminal of the rectifier 21 in series with a suitable biasing element, such as a battery 30 for biasing the grids 27 negatively in well known manner. Suitable grid resistors 31 are interposed between the output terminals of the excitation transformer 28 and grids 27 of the rectifier 21.

The primary windings of the excitation transformer 28 are connected to output terminals of a delta mesh 10 having the same impedance relationships as described above in connection with Fig. 1. A high-speed overload relay 24 is connected in the anode circuit of the rectifier 21, and a control relay 32 having back contacts 33 and front contacts 34 is provided for commutating the connections through the impedances 13 and 14. The control relay 32 is arranged to normally provide an alternating-current supply to the mesh 10 in series with the resistor 13. However, upon operation of the overload relay 24, the control relay 32 operates to interrupt the circuit through resistor 14 and to establish a circuit through the impedance 13. The control relay 32 is also arranged to establish a holding circuit for itself through its front contacts 34. A push button 35 is provided for interrupting the holding circuit for the control relay 32, when it is desired to cause the latter to drop out.

The static impedance mesh 10 is supplied from the same alternating current source 7 as the main transformer 22, in series with a suitable phase adjusting device 36. Although shown diagrammatically, the device 36 may include various phase modifying elements known in the art, such as a positive phase-sequence voltage filter for providing adequate excitation voltage during unbalanced faults.

The operation of the apparatus shown in Fig. 3 may be set forth as follows: For power flow from the alternating-current circuit 7 to the direct current circuit 23, the phase adjusting device 36 is preferably set so that the positive peak of excitation voltage supplied to each grid 27 leads the crest value of positive voltage applied to the corresponding anode 25 by 30°. This condition is indicated in Fig. 4, in which positive values of anode voltage are indicated by the sinusoidal half-waves 1, 2, 3, 4, 5 and 6, the reference point of zero potential being assumed as the secondary neutral of the transformer 22. As the anodes 25 are energized by symmetrical six-phase voltage, each of the peaks 1, 2, 3, 4, 5 and 6 is more positive than the others for an interval of 60° out of each complete cycle of 360°.

The curves $e_1$, $e_2$ indicate positive voltage peaks produced by the excitation transformer 28, these peaks appearing 30° before the crest value of anode voltage, as mentioned above. However, as the neutral point 29 is connected to the cathode 26, the reference point of zero potential for these curves is the cathode 26.

The grids 27, having a potential substantially equal to or more negative than the corresponding anode 25 throughout all except a few degrees of the cycle, interrupt the positive electrostatic field produced by the corresponding anode 25, and accordingly prevent the anode from assuming the arc current except at the instant when a positive excitation impulse $e_1$, $e_2$ is delivered to the corresponding grid 27.

The anode currents are indicated by the curves $i_1$, $i_2$. These currents are started at the instant of positive excitation peak and continue for a time interval of 60° plus an overlap period indicated as an angle $u$.

If a heavy overload or short-circuit occurs on the rectifier 21 (see Fig. 3), the overload relay 24 closes to complete a circuit for the control relay 32. The control relay 32, accordingly, operates to open the energizing circuit for the mesh 10 through the resistor 13, and establish another energizing circuit through the impedance 14. As explained above, in connection with Fig. 1, this change produces a shift of 90° in the excitation voltages produced by the mesh 10. The voltage relay 32 is held in through its holding circuit, until the push button 35 is operated to restore the apparatus to the position shown in Fig. 3.

Returning to Fig. 4, the shift of excitation voltage of 90° moves the excitation peaks from the phase angle positions $e_1$, $e_2$ to the phase angle positions $e_{11}$, $e_{22}$, etc. This change prevents a discharge from taking place between the anodes 25 and the cathode 26 at the time when the positive anode potential is maximum, and initiates such discharges when the anode potential is exactly 50% of maximum and falling rapidly. With such a phase position of excitation voltages, the anode potential is effective during a 60° angular interval such that the average anode potential is zero, as indicated by the shaded areas in Fig. 4.

Under these conditions the anode current which flows is quite small and pulsating in character, as only the harmonics of the voltage wave are effective to produce a current. Such current waves are indicated at $i_{11}$, $i_{22}$. The effect of such a change is to prevent any appreciable short circuit current flowing, until the apparatus is restored to working condition by operation of the push button 35. It is obvious that push button 35 can be replaced by a relay which will automatically perform the manual operation just described.

I do not intend that the present invention shall be restricted to the specific structural details, arrangement of parts, or circuit connections herein set forth, as various modifications thereof may be affected without departing from the spirit and scope of my invention. I desire, therefore, that only such limitations shall be imposed as are indicated in the appended claims.

I claim as my invention:

1. In combination with polyphase electric discharge means, excitation apparatus therefor comprising phase modifying means for transforming single-phase power to polyphase excitation power, impedance means associated with said phase-modifying means, and switch means for selectively establishing a first and a second connection of said phase-modifying means and at least part of said impedance means, said first and second connections having substantially the same values of absolute impedance but different values of impedance phase-angle.

2. In combination with polyphase electric discharge means, excitation apparatus therefor comprising an impedance network for transforming single-phase power to polyphase excitation power, external impedance means associated with said network, and switch means for selectively establishing a first and a second connection of said network and at least part of said external impedance means, said first and second connections having substantially the same values of absolute impedance but different values of impedance phase angle.

3. In combination with polyphase-electric discharge means, excitation apparatus therefor comprising an impedance network including a first group of three impedance elements of equal absolute impedance values, a second group of three impedance elements equal in absolute impedance to the elements of said first group but differing therefrom in impedance phase angle by 60° and conductors connecting said impedance elements of said first and second groups alternately in a delta mesh, external impedance means associated with said delta mesh and switch means for selectively establishing a first and a second connection of said mesh and at least part of said external impedance means, said first and second connection having substantially the same values of absolute impedance but different values of impedance phase angle.

4. In combination with polyphase electric discharge means, excitation apparatus therefor comprising an impedance network including a first group of three impedance elements of equal predetermined impedance value, a second group of the three impedance elements having absolute impedance of said predetermined value but differing in impedance phase angle by 60° from the elements of said first group and conductors connecting said impedance elements of said first and second groups alternately in a delta mesh, a first external impedance and a second external impedance connected to delta terminals of said mesh, said first external impedance having an absolute impedance value equal to $$\frac{2}{\sqrt{3}}$$

times said predetermined value, said second external impedance having an absolute impedance value equal to $$\frac{2}{\sqrt{3}}$$

times said predetermined value but differing in impedance phase angle from said first external impedance by 60°, and means for selectively impressing a single-phase voltage between the remaining terminal of said mesh and the remaining terminal of each of said external impedances.

5. In combination with polyphase electric discharge means, excitation apparatus therefor comprising an impedance network including a first group of three impedance elements of equal predetermined impedance value, a second group of three impedance elements having absolute impedance of said predetermined value but differing in impedance phase angle by 60° from the elements of said first group and conductors connecting said impedance elements of said first and second groups alternately in a delta mesh, a first external impedance and a second external impedance connected in series circuit with said mesh, said first external impedance having an impedance value of $(1.5-j.866)$ times said predetermined value, said second external impedance having an impedance value of $(1.5+j.866)$ times said predetermined value and differing in impedance phase angle from said first external impedance element by approximately 180°, and means for selectively excluding one of said external impedances from said series circuit.

ROBERT D. EVANS.